United States Patent [19]

Lewis et al.

[11] 3,787,074

[45] Jan. 22, 1974

[54] MULTIPLE PYRO SYSTEM

[75] Inventors: Donald J. Lewis, Troy; Robert L. Stephenson, Sterling Heights, both of Mich.

[73] Assignee: Allied Chemical Corporation, New York, N.Y.

[22] Filed: May 28, 1971

[21] Appl. No.: 147,913

[52] U.S. Cl. ............. 280/150 AB, 23/281, 102/39
[51] Int. Cl. ............................................ B60r 21/08
[58] Field of Search ..................... 23/281; 102/32; 280/150 AB

[56] References Cited
UNITED STATES PATENTS

| | | |
|---|---|---|
| 3,066,014 | 11/1962 | White ................................. 23/281 |
| 3,618,980 | 11/1971 | Leising ....................... 280/150 AB |
| 3,674,284 | 7/1972 | Lohr ........................... 280/150 AB |
| 3,089,419 | 5/1913 | Pollard ............................. 102/39 |
| 3,270,668 | 9/1966 | Silver ............................... 102/39 |
| 3,305,319 | 2/1967 | Kowalick et al. ................. 102/39 |
| 3,532,360 | 10/1970 | Leising et al. ............... 280/150 AB |
| 3,663,035 | 5/1972 | Norton ...................... 280/150 AB |

*Primary Examiner*—David Schonberg
*Assistant Examiner*—John P. Silverstrim
*Attorney, Agent, or Firm*—Jonathan Plaut

[57] ABSTRACT

This invention relates to the procedure of redundancy, without operational compromise, in the supply of generated gas from a pyrotechnic device to an inflatible bag assembly.

3 Claims, 1 Drawing Figure

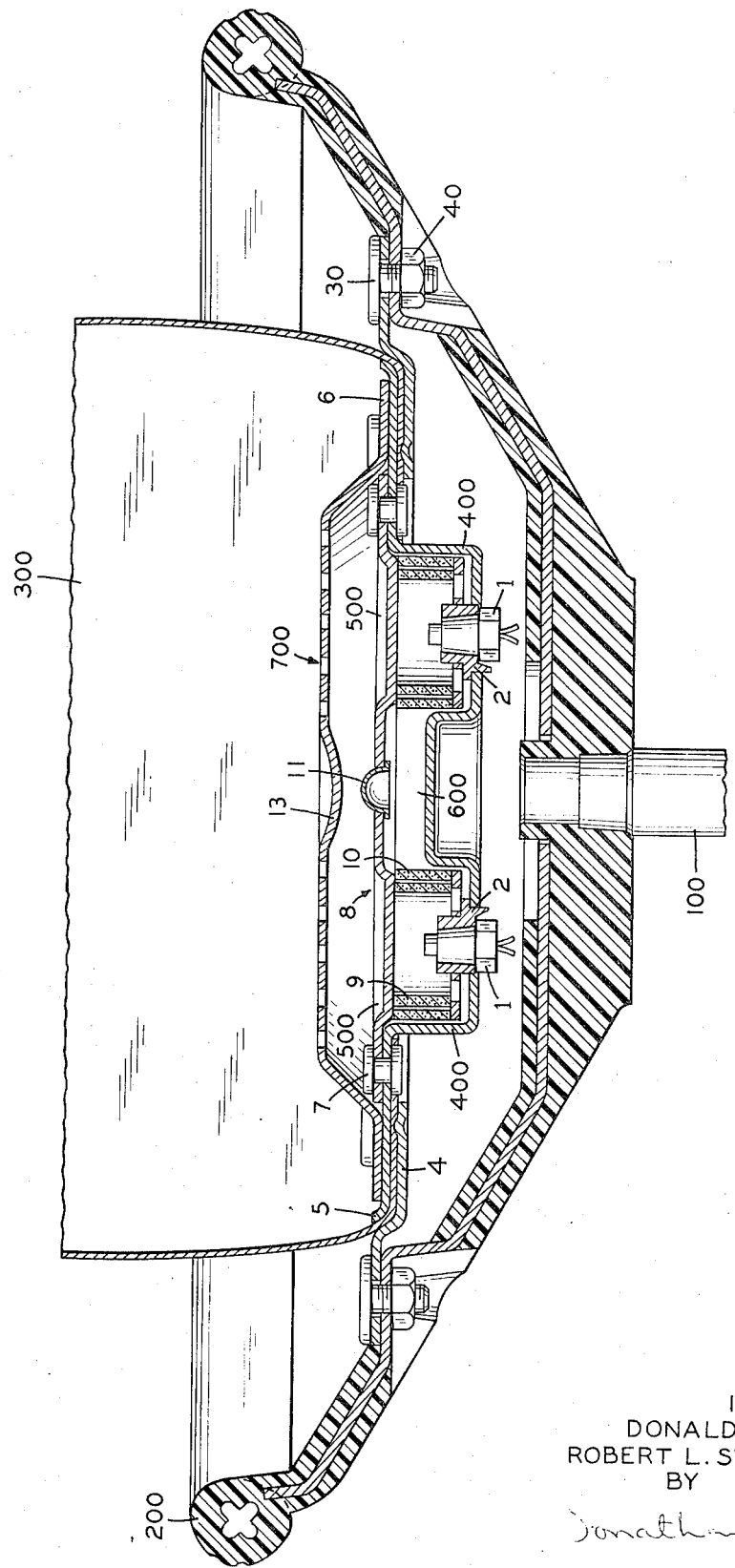

MULTIPLE PYRO SYSTEM

This invention relates to a pure pyrotechnic device for supplying inflating gas to inflatible bag assembly.

BACKGROUND OF INVENTION

It has been proposed in the past to provide gas source means for inflatible bag mounted on the steering column or within the steering rim of an automobile. Such gas source means has been (a) a gas cylinder, or (b) a gas cylinder in combination with pyrotechnic means, or (c) purely pyrotechnic means. The provision of purely pyrotechnic means is desirable since such a system is of less weight, does not necessitate a stored gas source and takes up much less space; space being at a premium for the gas source means mounted on the steering column or within the steering rim.

Furthermore, where a purely pyrotechnic system is utilized, it is especially important that the system fire properly, since no already existing gas source (such as a container of compressed gas) is available. There is, therefore, a special need for an inflating system involving a highly efficient method of redundancy in inflation but not causing the operational compromise. It is also desirable that the system be of such design so as not to present an off center balancing problem to the steering wheel mechanism.

BRIEF DESCRIPTION OF INVENTION

Applicants invention is related to the provision of dual, pyrotechnic powder groins balanced on the center line of the steering shaft and each with it own squib ignitor. The pyrotechnic groins are inter-connected by a passageway similarly centrally located and therebetween, that is across the axis of the steering shaft, so that in the event that one ignitor or other part of the ignitor system does not fire, the burning of the other pyrotechnic ring through the passageway will cause burning of the ring associated with the non-performing ignitor system. The generated gases rupture a plug centrally located between the pyrotechnic rings and on the axis of the steering shaft, are deflected by a similarly centrally located deflector and exit through the manifold into the air bag system. No compressed gas cylinder or storage bottle is utilized and the entire unit just described is located so that as to be effectively within the air bag which it is inflating, so that leaks that might occur are directed into the manifold bag and bag assembly.

Because of (a) the nature of the type of propellant utilized, generation of relatively low pressure of gases involved (at about 2,500 to 4,000 psi, and in one embodiment, for example), which will be described in more detail, and (b) the balancing about the steering shaft axis and the structural provisions allowing for any leaking of gases of generated gases that does occur to be directed into the manifold and bag assembly, stamped parts may be used for the assembly producing economic manufacture.

DESCRIPTION OF DRAWING

The drawing shows cut away view of one embodiment of the invention.

DETAILED DESCRIPTION OF INVENTION

In the drawing, there is shown a steering shaft 100 with a steering rim 200 mounted thereon. Mounted to the struts of connection between the rim and the shaft is a gas generating assembly; the mounting being, for example, by use of bolts 30 and nuts 40 attaching bag retaining plate 4 to said strut. Mounted to said plate 4 is inner manifold housing plate 5, as by rivets 7. The bag 300 to be inflated is located between the plate 5 and 4 and held thereby.

Located within the plate 5, is each of the recessed areas 400, are pyrotechnic (gas producing) assemblies. Two such recessed areas are shown the drawing, but more could be provided for, as long as they are located in a symetric arrangement about the center line of shaft 100 for balance. The pyrotechnic assembly found within each of the recessed areas 400 is composed, in a preferred embodiment, of a powder charge of PVC combined with oxidizer (potassium perchlorate and potassium nitrate), is actuated by an ignitor 1 (such as a squib) mounted with a plug 2. The ignitor extends through an orifice in the recess 400 and is connected to the sensing device (not shown) or other means energizing the ignitor to set off the powder charge.

The pyrotechnic system in the recess is capped off by a cover 8, which advantageously has ribs 500 for holding the charge in place in the recess and giving added strength.

Outer manifold cover 6 forms with cover 8 a manifold 700 which is apertured (not shown) for release of the generated gas to the surrounding air bag or bag system 300. Generated gas enters the manifold from the recesses 400 through the rupture plug 11, made of nylon, for example, after passing through interconnecting passageway 600 between the recessed areas 400, said passageway formed by housing plate 5 and cover 8. Deflector 13 in the form of a convex portion of cover 6 (viewing it in the direction of gas flow) spreads the gas laterally into the diffuser and then into the air bag, as described.

The total charge in the recesses is sufficient to provide enough gas to fill the bag in the required time and to the required volume, and is divided so as to be located in the plurality of recesses 400. If an ignitor located in one of the recessed areas 400 does not function, or if for some other reason the charge in such a recess is not burned, the reaction from the other recessed area or areas will spread to the malfunctioning recessed area through the passageway 600 to burn the unburned charge. Thus, redundancy is provided for in this simple apparatus — insuring that the system will function to burn the charge if an ignitor or other part does not function, without the addition of extra charge which would compromise the system as to balance or over pressure, for example.

As shown, the manifold and recessed area functionally are within the envelope of the bag 300, so that leaks and seepage of generated gas are passed into the bag, making elaborate gasketing unnecessary.

It will be noted that the top encasing plate of the generator in the direction of the flow of the gas forms the bottom plate of the manifold (plate 5) thus eliminating excess generator chamber structure and insuring that seepage or leaks flow directly into the manifold and bag, as discussed. The substantial elimination of the leakage problem by this simple design allows stampings to be used in the construction rather than castings or forgings, and economic saving in construction.

In operation of the embodiment shown, firing of the ignitors 1 in the two recesses 400 shown, causes burning and activation of the powder charge rings 9 and 10. If one ignitor 1 does not burn, the associated powder ring will be activated by the burning from the other recess through passageway 600, to provide the required redundancy without adding pressure raising extra powder or structure putting the system off balance. The base generated, which is of relatively low pressure in this embodiment, as discussed, blows plug 11 and passes directly into the manifold 700 from which it passes into thebag assembly through apertures in the manifold cover 6 for protection of the driver or passenger.

Although the invention has been described with particularity with relation to the embodiment drawing, it is understood that it is intended that materials and operating conditions(such as pressure) are illustrative only and that applicants intend to be limited only by the scope of the following claims:

We claim:

1. An inflatable assembly comprising a plurality of symmetrically disposed discrete pyrotechnic gas producers mounted in an enclosed housing; a plurality of ignitors for igniting said producers, each of said ignitors directly associated with separate ones of said producers; a passageway devoid of gas producer directly connecting said producers to ensure ignition of all of said producers in the event that less than all said ignitors fail to function; a manifold mounted in said assembly; a single outlet interconnecting said housing and said manifold said outlet disposed in said passageway centrally of said symetrically disposed producers; a removable plug normally covering said outlet, said plug removed as a result of increased pressure communicated to it through said passageway by the build-up of gas derived from said gas producers; and an inflatable unit disposed about and in communication with said manifold.

2. An assembly, in accordance with claim 10, wherein said manifold is provided with a deflecting rib opposite said removable plug in said passageway to diffuse said gas in said manifold.

3. An assembly, in accordance with claim 10, wherein only two of said pyrotechnic gas producers ar provided and said assembly is disposed on the steering wheel of a vehicle.

* * * * *

PQ-1050
(5/69)

UNITED STATES PATENT OFFICE
CERTIFICATE OF CORRECTION

Patent No. 3,787,074      Dated January 22, 1974

Inventor(s) Donald J. Lewis and Robert L. Stephenson

It is certified that error appears in the above-identified patent and that said Letters Patent are hereby corrected as shown below:

Column 3, line 7, "base" should be --gas--.

Column 4, claim 2, line 1, "10" should be --1--;

Column 4, claim 3, line 1, "10" should be --1--;

Column 4, claim 3, line 2, "ar" should be --are--.

Signed and sealed this 3rd day of September 1974.

(SEAL)
Attest:

McCOY M. GIBSON, JR.
Attesting Officer

C. MARSHALL DANN
Commissioner of Patents